B. MAZURYK.
STUMP PULLER.
APPLICATION FILED SEPT. 18, 1919.
1,357,577.
Patented Nov. 2, 1920.
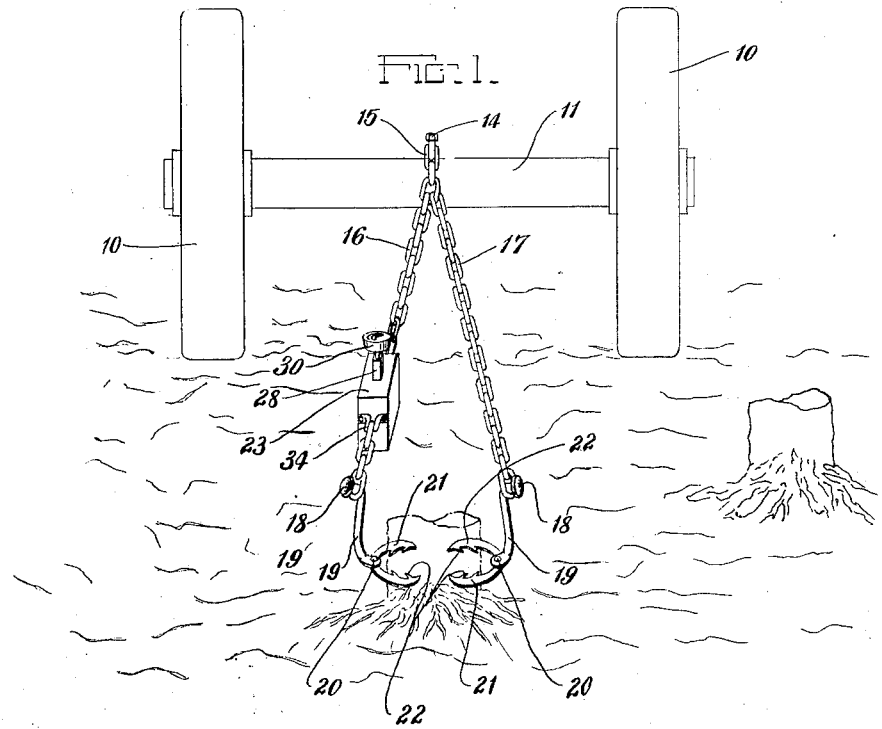
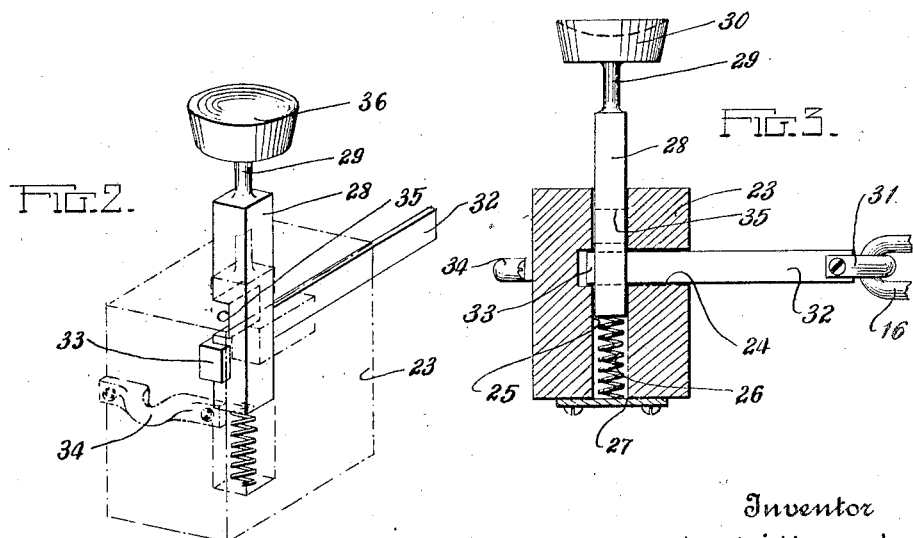
Inventor
Bartlomiej Mazuryk,
By his Attorney
Adam E. Schatz

UNITED STATES PATENT OFFICE.

BARTLOMIEJ MAZURYK, OF TUGASKE, SASKATCHEWAN, CANADA.

STUMP-PULLER.

1,357,577.  Specification of Letters Patent.  Patented Nov. 2, 1920.

Application filed September 18, 1919. Serial No. 324,476.

*To all whom it may concern:*

Be it known that I, BARTLOMIEJ MAZURYK, a citizen of Poland, residing at Tugaske, Province of Saskatchewan, and Dominion of Canada, have invented certain new and useful Improvements in Stump-Pullers, of which the following is a specification.

This invention has as its object the provision of means whereby stumps and roots may be extracted from the soil in a rapid and practical manner.

A further object is to provide means whereby, should the strain upon the draft chains become excessive, they may be disengaged by proper manipulation of a release element combined therewith.

These and other like objects are attained by the novel construction and combination of parts hereinafter described, and shown in the accompanying drawings, forming a material part of this disclosure, and in which—

Figure 1 is a perspective view showing a stump puller made in accordance with the invention.

Fig. 2 is an enlarged perspective view showing the releasing block set in one or both of the pulling chains, and Fig. 3 is a vertical sectional view taken substantially through the center thereof.

Referring to the drawings in detail, the numeral 10 indicates a pair of traction wheels carrying an axle 11, and engaged centrally of the axle, by the pin 14, is a clevis 15, in which the elements 16 and 17 of a chain are fixedly engaged.

The opposite ends of the chain are secured upon outturned headed elements 18, formed with levers 19, pivotally engaged by the pins 20, with a pair of oppositely disposed hook elements 21, having teeth 22 formed upon their interior, curved surfaces adapted to firmly grip the stump or root to be removed.

The implement is adapted to be drawn by horses or other draft animals when engaged with the stump in the manner indicated, and a powerful pull exerted tending to disrupt and withdraw the stump from the ground. Should however, the pull become excessive, a device is placed in the length of one of the chain elements 16, the device consisting of a block 23, formed with a recess 24, extending transversely in from one side, a longitudinal rectangular opening 25 passing vertically through the block, in which is secured the coils of a compression spring 26, the lower end of which abuts against a plate 27, fixed upon the lower end of the block 23, while the upper end of the spring presses against a plunger 28 having a stem 29, and terminating in an enlarged head 30, the plunger being slidable within the central passage 25, and having a cross notch 35 in one edge.

The end link of the chain element 16 is engaged in a clevis 31, secured upon a bar 32, passing into the transverse recess 24, and provided with a hook shaped terminal 33, adapted to engage with the shank of the plunger 28, under normal circumstances.

A loop or eye 34 is secured to the side of the block 23, opposite the recess 24, to which the other end of the chain may be attached.

In order to disengage the device, a recess or slot 35 is formed transversely through the rectangular plunger bar 28, the same being adapted to permit the hook end 33 of the bar 32 to pass through when the plunger is depressed.

In operation, the chains 16 and 17 are both stressed as the axle 11 is advanced, whence the stump is loosened in its seat. Thereupon, the knob 30 is depressed, releasing the chain 16, thus allowing the chain 17 to suddenly twist the stump by its continued pull. Thereby the stump is sufficiently loosened to enable the same to be lifted from its bed either by the continued pull of the chain 17, or by hand.

Having thus described my invention what I claim as new and desire to secure by Letters Patent, is—

A stump puller comprising, in combination with a wheeled axle, a pair of chains attached to said axle, grapple hooks on the ends of said chains adapted to grasp the stump, one of said chains being provided with means for suddenly permitting the parting thereof.

In testimony whereof I have affixed my signature.

BARTLOMIEJ MAZURYK.